United States Patent [19]

Toyofuku

[11] Patent Number: 5,289,000
[45] Date of Patent: Feb. 22, 1994

[54] IMAGE READING METHOD AND APPARATUS DETERMINING SYNCHRONOUS POSITION

[75] Inventor: Takashi Toyofuku, Kanagawa, Japan

[73] Assignee: Fuji Photo Film Co., Ltd., Kanagawa, Japan

[21] Appl. No.: 94,861

[22] Filed: Jul. 22, 1993

[30] Foreign Application Priority Data

Jul. 22, 1992 [JP] Japan .................. 4-195385

[51] Int. Cl.⁵ .......................... H01J 3/14; H04N 1/21
[52] U.S. Cl. ..................................... 250/234; 358/497
[58] Field of Search ............ 250/208.1, 234-236; 358/474-475, 409, 412, 494, 497

[56] References Cited

U.S. PATENT DOCUMENTS

| | | | |
|---|---|---|---|
| 4,893,196 | 1/1990 | Koshiyouji et al. | 358/497 |
| 5,107,344 | 4/1992 | Nosaki et al. | 358/497 |
| 5,109,288 | 4/1992 | Moriya | 358/497 |
| 5,142,382 | 8/1992 | Yamada | 358/497 |

*Primary Examiner*—Michael Messinger
*Attorney, Agent, or Firm*—Sughrue, Mion, Zinn, Macpeak & Seas

[57] ABSTRACT

An image reading method and apparatus are capable of high-quality reading of a transparent original with an optimum light quantity by maintaining both a transmitting light source unit and a reading scanner at an adequate relative position to keep their optical axes in alignment during scan reading. Such alignment is achieved by providing synchronization in scanning speed by placing either one of the transmitting light source unit and the reading scanner at an arbitrary selected position, scanning the proximity of the selected position with the other, determining a light quantity distribution, determining a synchronous position from the distribution, carrying out such synchronous position detection at two or more distinct positions, and calculating the scanning speed ratio of the transmitting light source unit to the reading scanner from the result. Alternatively, alignment is achieved by carrying out similar synchronous position detection, determining the relative spacing between the base points of said transmitting light source and said reading scanner from the distances from the respective base points to the synchronous position, and matching the scan start positions of the transmitting light source unit and the reading scanner in accordance with the relative spacing.

4 Claims, 5 Drawing Sheets

IMAGE READING METHOD AND APPARATUS DETERMINING SYNCHRONOUS POSITION

BACKGROUND OF THE INVENTION

1. Field of the Invention

This invention relates to an image reader for use in printing plate making apparatus and copying apparatus. More particularly, it relates to a method and apparatus for reading an image from a transparent original by synchronously translating a transmitting light source for emitting light toward the original and a reading scanner for receiving the light transmitted by the original, thereby scanning the original, characterized by providing synchronization in scanning speed or matching in scan start position between the transmitting light source and the reading scanner prior to scan reading of the original.

2. Prior Art

Advanced image readers for use in printing plate making apparatus and copying apparatus are required to have the ability to read not only reflective originals such as photographs and printed documents, but also transparent originals (or transparency) such as reversal film and negative film.

A conventional image reader includes a platen on which an original rests, a reading scanner disposed below the platen and an optical reading system coupled with the scanner. For reading a transparent original, there is added a transmitter assembly which is disposed on the platen for illuminating the original whereby the optical reading system receives the light transmitted by the original.

There are known a variety of transparency transmitter assemblies which are classified, depending on the manner of providing the light transmitted by the original, into the back light type using a tungsten halogen lamp or a similar lamp for illuminating the entire surface of the original, the shircusten type using a plurality of rod-shaped lamps for illuminating the entire surface of the original, and the light source scanning type using a rod-shaped lamp such as a fluorescent lamp with which the original is scanned in a vertical scan or auxiliary scan direction thereby providing two-dimensional scanning over the entire surface of the original.

The transparency transmitter assemblies of the back light and shircusten types use a simple mechanism, but require a great light intensity or quantity or a number of lamps and are difficult to illuminate the entire surface of a transparent original with a uniform light quantity (intensity). The transparency transmitter assembly of the light source scanning type is advantageously used in the application where image reading of high image quality is required as in printing plate formation.

The transparency transmitter assembly of the light source scanning type includes a transparent original transmitting light source unit having a rod-shaped light source for emitting reading light toward a transparent original, the reading light extending in the same one-dimensional direction as the light source in the reading scanner of the image reader. Also included is a drive source for translating the transmitting light source unit in an auxiliary scan direction or a direction substantially perpendicular to the one-dimensional direction.

The transparency transmitter assembly of the light source scanning type is disposed on the platen of the image reader and adapted to translate the original transmitting light source unit in the auxiliary scan direction for providing two-dimensional illumination to the transparent original on the platen. If the reading scanner of the image reader is translated synchronously with the transmitting light source unit, the light emitted by the rod-shaped lamp and transmitted by the transparent original is caught by the reading scanner and photoelectrically read by the optical reading system associated with the scanner.

In the transparency transmitter assembly of the light source scanning type, a transparent original is read by synchronously translating the light source unit of the transmitter assembly and the reading scanner of the image reader as described above. Accordingly, to ensure image reading of high quality with an optimum light quantity, the transmitting light source unit and the reading scanner must be synchronously translated for scanning with their optical axes aligned, that is, while maintaining them in a selected relative position.

The transparency transmitter assembly is used by setting it on the image reader in place only when it is desired to read a transparent original. The light source unit of the transmitter assembly and the reading scanner of the image reader have independent drive sources for their translation. Then even though both the components have an identical scanning speed at the stage of design, motors as the drive sources and transmission mechanisms for transmitting the motor drive force to the reading scanner or the transmitting light source unit inevitably have individual differences or mechanical errors which can introduce a difference in scanning speed between the transmitting light source unit and the reading scanner. It can also happen that the scanning speed is somewhat changed by repair or translation of the transmitting light source unit and the reading scanner. In such cases, the transmitting light source unit and the reading scanner cannot be maintained in a consistent relative position during the entire period of scan reading.

Also, even when the transmitting light source unit and the reading scanner have an identical scanning speed, if they cannot be brought to an adequate relative position for optical axis alignment at the initial when scan reading is started, then high-quality reading of a transparent original with an optimum light quantity is impossible.

During normal operation, the transparency transmitter assembly is not disposed on the image reader. When reading of a transparent original is desired, the user sets the transparency transmitter assembly in place on the image reader and hence, on the platen. The assembly includes a lid which is opened for replacement of the transparent original by a new one and closed on every reading operation.

On attachment of the transparency transmitter assembly and opening/closing of the lid thereof, the relative position between the transmitting light source unit and the reading scanner, especially between their base or home positions is changed. Then the transmitting light source unit and the reading scanner cannot be matched in position in the auxiliary scan direction at the initial when scan reading is started. With their optical axes misaligned, high-quality reading of a transparent original with an optimum light quantity is impossible.

SUMMARY OF THE INVENTION

An object of the present invention is to eliminate the above-mentioned problems of the prior art and to provide an image reading method capable of high-quality reading of a transparent original with an optimum light intensity (quantity) by maintaining both a transmitting light source unit for reading the transparent original and a reading scanner of an image reader at an adequate relative position to keep their optical axes in alignment during scan reading, such maintenance being achieved by providing synchronization in scanning speed or matching in scan reading start position between the transmitting light source unit and the reading scanner. Another object of the present invention is to provide an image reading apparatus for practicing the method.

According to a first mode of a first aspect of the invention, there is provided a method for reading an image from a transparent original on a platen using a transmitting light source extending in a one-dimensional direction for emitting light toward the original and a reading scanner disposed below the platen and extending in the one-dimensional direction for receiving the light transmitted by the original. The transparent original is read by translating the transmitting light source in an auxiliary scan direction substantially perpendicular to the one-dimensional direction for illuminating the original over a two dimensional extent, and translating the reading scanner in synchronization with the transmitting light source, thereby photoelectrically reading the image in the original. The method is characterized by providing synchronization in scanning speed between the transmitting light source and the reading scanner. A synchronous position is detected by positioning (placing) either one of the transmitting light source and the reading scanner at a selected position, performing scanning in the proximity of the selected position with the other one of the transmitting light source and the reading scanner, determining the distribution of an intensity or a quantity of light transmitted by the original during the scanning, and determining a synchronous position for the other one corresponding to the selected position on the basis of the light intensity or quantity distribution. Such synchronous position detection is carried out at two or more distinct positions. From the results of synchronous position detection at the distinct positions, the number of pulses developed until the transmitting light source and the reading scanner are translated to the synchronous position is determined. From the number of pulses, the pulse-to-distance conversion coefficient of at least one of the transmitting light source and the reading scanner is calculated. Using the calculated pulse-to-distance conversion coefficient, the transmitting light source and the reading scanner are synchronized in scanning speed.

According to a second mode of the first aspect of the invention, there is also provided an image reading apparatus comprising an image reader including a platen on which an original rests, a reading scanner for irradiating reading light extending in a one-dimensional direction to the original on the platform, a drive means for translating the reading scanner at a predetermined scanning speed in a direction substantially perpendicular to the one-dimensional direction, and an photo-electric transducer means for receiving the reading light reflected by the original; an original transmission assembly removably disposed on the platen at a predetermined position, the assembly including a transmitting light source for emitting reading light extending in the one-dimensional direction toward a transparent original on the platen, and drive means for translating the transmitting light source in synchronization with the translation of the reading scanner; and synchronization means for providing synchronization in scanning speed between the transmitting light source and the reading scanner. The original transmission assembly is disposed on the platen of the image reader. The synchronization means functions to provide synchronization by translating either one of the transmitting light source and the reading scanner to a selected position, performing scanning in the proximity of the selected position with the other one of the transmitting light source and the reading scanner, determining the distribution of an intensity or a quantity of light transmitted by the original during the scanning, determining a synchronous position for the other one corresponding to the selected position on the basis of the light intensity or quantity distribution, carrying out such synchronous position detection at two or more distinct positions, determining from the results of synchronous position detection at the distinct positions the number of pulses developed until the transmitting light source and the reading scanner are translated to the synchronous position, and calculating from the number of pulses the pulse-to-distance conversion coefficient of at least one of the transmitting light source and the reading scanner.

According to a first mode of a second aspect of the invention, there is provided a method for reading an image from a transparent original on a platen using a transmitting light source extending in a one-dimensional direction for emitting light toward the original and a reading scanner disposed below the platen and extending in the one-dimensional direction for receiving the light transmitted by the original. The transparent original is read by translating the transmitting light source in an auxiliary scan direction substantially perpendicular to the one-dimensional direction for illuminating the original over a two dimensional extent, and translating the reading scanner in synchronization with the transmitting light source, thereby photoelectrically reading the image in the original, each of the transmitting light source and the reading scanner having a base point and a scan start position at which it is positioned at the start of scan reading of the original. The method of the second aspect is characterized by providing matching between the scan start positions of the transmitting light source and the reading scanner prior to reading of the original. A synchronous position is detected by positioning (placing) either one of the transmitting light source and the reading scanner at a selected position, performing scanning in the proximity of the selected position with the other one of the transmitting light source and the reading scanner, determining the distribution of an intensity or a quantity of light transmitted by the original during the scanning, and determining a synchronous position for the other one corresponding to the selected position on the basis of the light intensity or quantity distribution. From the distances from the respective base points of the transmitting light source and the reading scanner to the synchronous position, the relative spacing between the base points of the transmitting light source and the reading scanner is then determined. The scan start positions are matched in accordance with the relative spacing.

According to a second mode of the second aspect of the invention, there is also provided an image reading apparatus comprising an image reader including a platen on which an original rests, a reading scanner for irradiating reading light extending in a one-dimensional direction to the original on the platform, a drive means for translating the reading scanner at a predetermined scanning speed in a direction substantially perpendicular to the one-dimensional direction, and an photo-electric transducer means for receiving the reading light reflected by the original; an original transmission assembly removably disposed on the platen at a predetermined position, the assembly including a transmitting light source for emitting reading light extending in the one-dimensional direction toward a transparent original on the platen, and drive means for translating the transmitting light source in synchronization with the translation of the reading scanner, each of the transmitting light source and the reading scanner having a base point and a scan start position at which it is positioned at the start of scan reading of the original; and alignment means for providing matching between the scan start positions of the transmitting light source and the reading scanner prior to reading of the original. The alignment means functions to provide matching by translating either one of the transmitting light source and the reading scanner at a selected position, performing scanning in the proximity of the selected position with the other one of the transmitting light source and the reading scanner, determining the distribution of an intensity or a quantity of light transmitted by the original during the scanning, determining a synchronous position for the other one corresponding to the selected position on the basis of the light intensity or quantity distribution, and determining the relative spacing between the base points of the transmitting light source and the reading scanner from the distances from the respective base points of the transmitting light source and the reading scanner to the synchronous position. The scan start positions are matched in accordance with the relative spacing.

BRIEF DESCRIPTION OF THE DRAWINGS

Other objects and advantages of the present invention will become apparent from the following detailed description taken in conjunction with the accompanying drawings, in which.

DETAILED DESCRIPTION OF THE INVENTION

Figure 1:
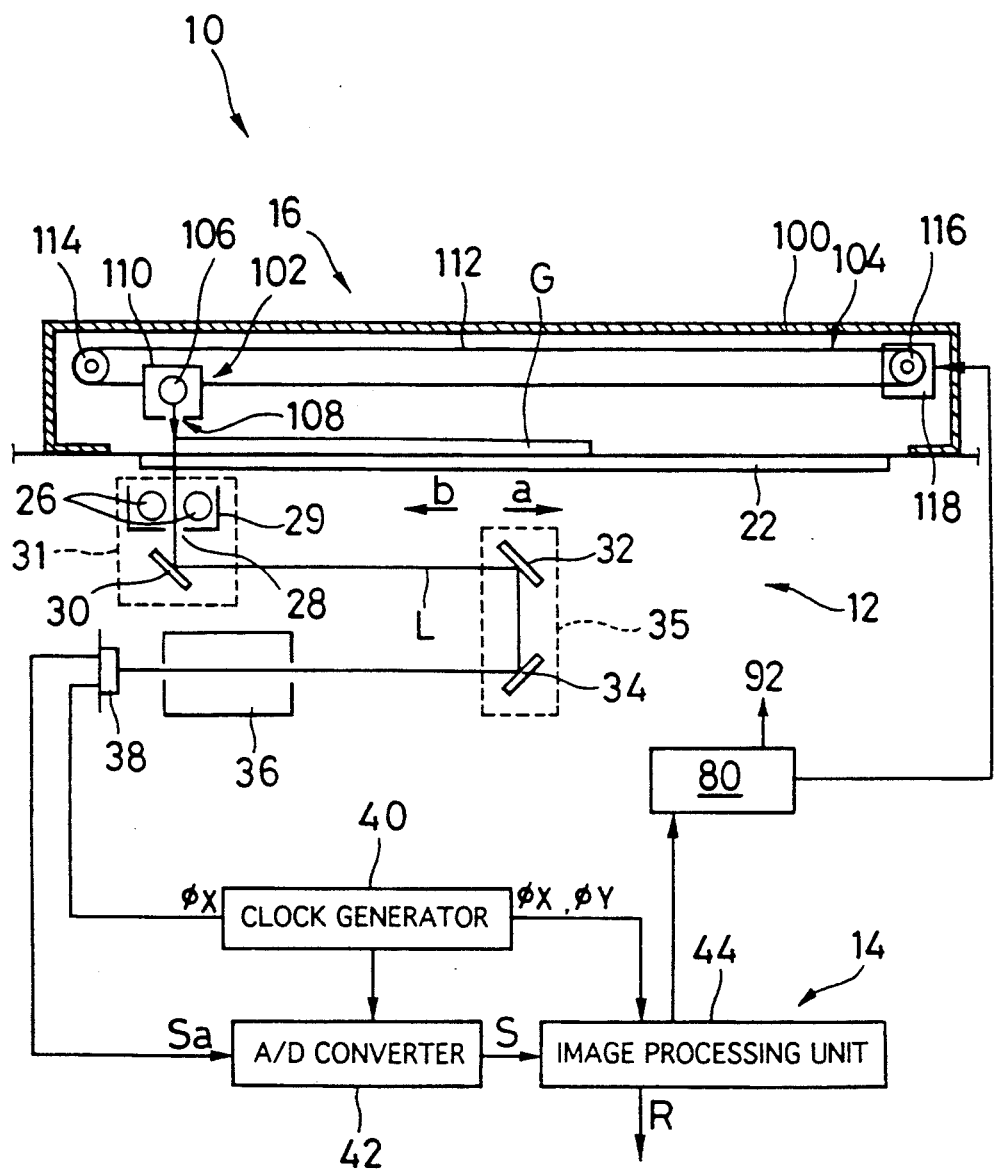
FIG. 1 is a schematic view showing one embodiment of an image reading apparatus for use in a printing plate making apparatus for practicing an image reading method according to the present invention.

The present invention uses an image reader including a reading scanner for emitting toward an original reading light extending in a one-dimensional or main scan direction and adapted to be translated in an auxiliary scan or auxiliary scan direction substantially perpendicular to the main scan direction for two-dimensional scanning of the original, and an optical reading system coupled with the scanner for photoelectrically reading the scanning light. Also used is a transmitter assembly including a transmitting light source unit extending in the one-dimensional or main scan direction and adapted to translate the transmitting light source unit in the auxiliary scan direction. Reading is carried out by translating the transmitting light source in the auxiliary scan direction for illuminating a transparent original over a two dimensional extent, and translating the reading scanner in synchronization with the transmitting light source, whereby the light transmitted by the original is received by the optical reading system for photoelectrical reading. The first form achieves the object by providing synchronization in scanning speed between the transmitting light source and the reading scanner. The second form achieves the object by providing matching between the initial or scan start positions of the transmitting light source and the reading scanner.

In the image reading method and apparatus in the first aspect of the present invention, either one of the transmitting light source and the reading scanner is translated from its base or home position to an arbitrary selected position, and the other one of the transmitting light source and the reading scanner translates in the proximity of the selected position for scanning, thereby determining the distribution of an intensity or a quantity of light transmitted by the original in the auxiliary scan direction during the scanning. A center in the light intensity (quantity) distribution is detected, for example, by delimiting a region of the light quantity distribution in excess of a predetermined threshold and locating a center of this region. This center gives a synchronous position corresponding to the selected position.

Such a synchronous position is detected at two or more distinct positions. Since the difference between the translation distances covered by the transmitting light source and the reading scanner at each of the distinct positions corresponds to the relative spacing between the home positions of the transmitting light source and the reading scanner, the relative spacings at two distinct positions are equal. If the accurate translation distance of either one of the transmitting light source and the reading scanner or the pulse-to-distance conversion coefficient thereof, where the drive source is a pulse motor, is known, the accurate translation distance or pulse-to-distance conversion coefficient of the other one can be calculated. This allows the transmitting light source and the reading scanner to be adjusted to have an identical translation speed, enabling reading of the transparent original in a consistent relative position at which their optical axes are maintained in alignment for translation in the auxiliary scan direction, and hence, high-quality reading of the transparent original with an optimum light quantity (intensity).

In the image reading method and apparatus in the second aspect of the present invention, the transmitting light source and the reading scanner are matched at the scan start position to place them at a proper relative position. The synchronous position is determined as in the first embodiment, but only at one arbitrary selected position. By determining the distances covered by the transmitting light source and the reading scanner from the respective home positions to the synchronous position (a difference in the translation distances), the accurate spacing between their home positions can be determined.

Then by taking into account the thus determined spacing between the home positions in addition to the translation distances covered by the transmitting light source and the reading scanner to the scan start position, the transmitting light source and the reading scanner can be placed at an adequate relative position to align their optical axes in the auxiliary scan direction prior to the start of scan reading.

In this way, the image reading method and apparatus of the present invention allow the transmitting light source of the transmitter assembly and the reading scanner of the image reader to be placed at an adequate relative position to provide alignment between their optical axes, enabling high-quality reading of a transparent original with an optimum light quantity.

EMBODIMENTS

Figure 2:
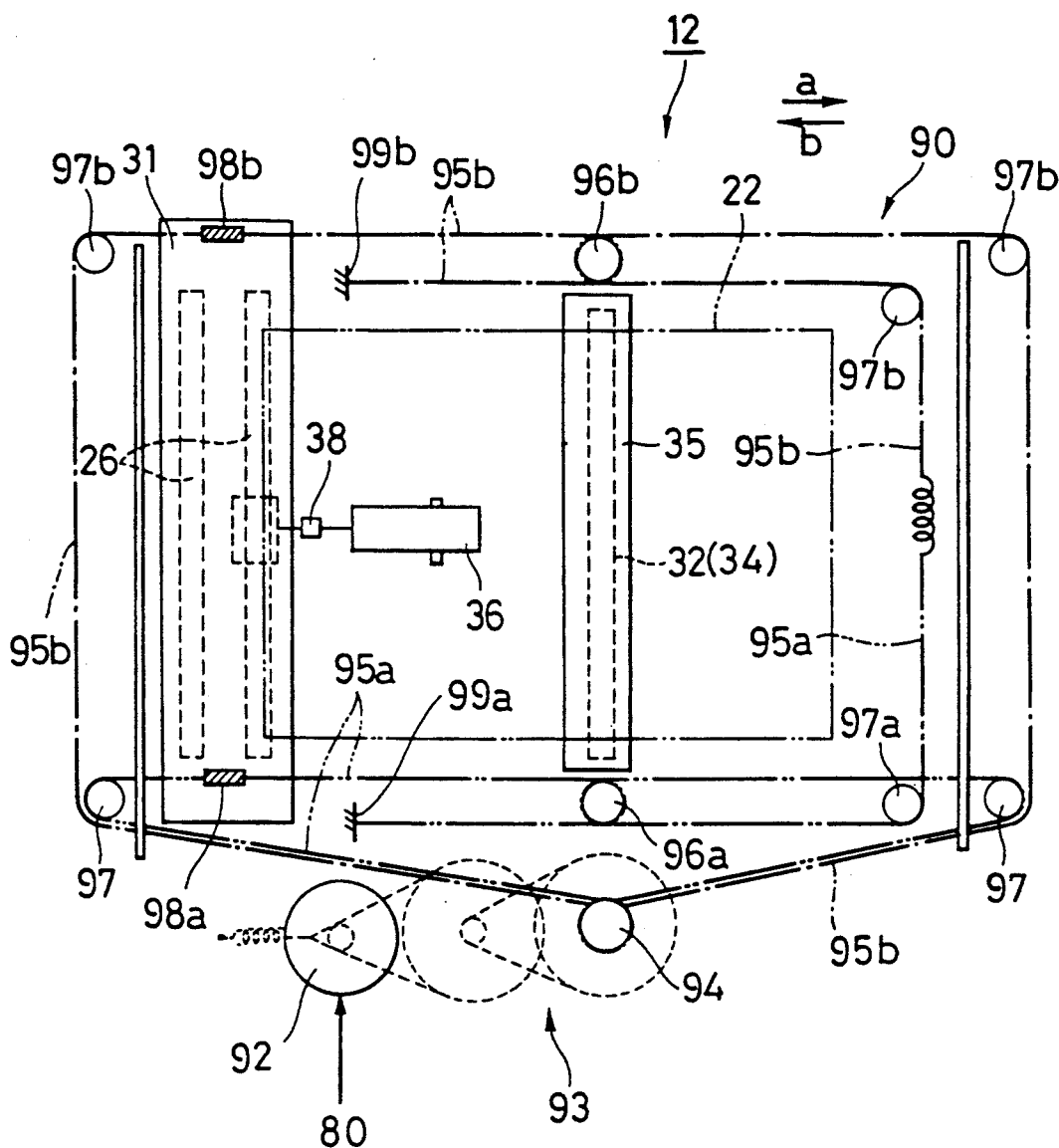
FIG. 2 is a schematic plan view of one exemplary image reader of the image reading apparatus of FIG. 1.

Referring to FIGS. 1 and 2, there is schematically illustrated an image reading apparatus for reducing into practice the image reading method of the invention. Although the invention is described with reference to the image reading apparatus intended for use in a printing plate making apparatus, the invention is not limited thereto, but applicable to various image forming apparatus including copying machines and printers.

The image reading apparatus generally designated at 10 in FIG. 1 is adapted to read images in not only conventional reflective originals such as photographs and printed documents, but also transparent originals (or transparency) such as negative films and reversal films, and generally includes an image reader 12, an image processor 14 and a transparent original transmission assembly 16 removably attached to the top of the image reader 12.

The image reader 12 is basically of the same construction as a conventional image reader for reflective originals. It includes a platen 22 in the form of a transparent glass plate on which a transparent original G (or reflective original) rests; a reader light source unit 31 for constituting a reading light source for illuminating a reflective original, the unit having two elongated fluorescent lamps 26, 26 disposed beneath the platen 22 and extending in a one-dimensional direction or main scan direction, a casing 29 enclosing the lamps 26 on the lower side, a slit 28 defined in the casing 29 and between the lamps 26 for passing the light transmitted by transparent original G or light reflected by the reflective original as slit light having a predetermined slit width and length, and a first mirror 30 disposed immediately beneath the slit 28 for turning the path L of transmitted or reflected light to an auxiliary scan direction shown by an arrow a, the light then proceeding along a light path L; a mirror unit 35 having second and third mirrors 32 and 34 for turning light path L to an opposite direction shown by an arrow b; a focusing lens 36 for focusing the slit light bearing the original's image; and a charge coupled device (CCD) 38 located at the focus of the lens 36 for receiving the original's image along a line in the main scan direction as a block of light values for photoelectrically converting them into analog electric signals representative of image density data Sa. There is separately provided a platen cover (not shown) which is to rest on the platen 22 when the original transmission assembly 16 is removed.

The reader light source unit 31 constitutes a reading scanner according to the invention. When the reader light source unit 31 is moved for scanning along the lower surface of the platen 22 in the auxiliary scan direction a or b at a predetermined auxiliary scan speed, the mirror unit 35 is moved in the same auxiliary scan direction at a speed corresponding to one-half of the auxiliary scan speed such that the light path L extending from transparent original G to the CCD 38 may always have an equal length.

In the apparatus shown in FIG. 1, the reader light source unit 31 or scanner has a predetermined home or base position on the left end side of the platen 22. The reader light source unit 31 performs preliminary scanning (pre-scanning) when it translates from the base position (scanning start point) to a scanning end point on the right end side of the platen 22 in the auxiliary scan direction shown by arrow a, that is, on an outward path. The reader light source unit 31 or scanner is reversed at the scanning end point. The reader light source unit 31 performs principal scanning on the original or an effective image region in the original (referred to as principal scanning region, hereinafter) when it translates back to the base position, that is, on a homeward path.

As shown in FIG. 2, the image reader 12 includes a drive means 90 for driving the reader light source unit 31 or scanner and the mirror unit 35 during pre-scanning, principal scanning and light source synchronization. The drive means 90 includes a drive motor 92, a speed governor 93, a wire driving pulley 94, wires 95a and 95b, movable pulleys 96a and 96b attached to opposite ends of the mirror unit 35, and a plurality of idlers 97a and 97b.

In the drive means 90, rotation of the reader drive motor 92 in the form of a pulse motor or stepper motor is reduced by the speed governor 93 in the form of a belt transmission means and then transmitted to the wire driving pulley 94. The wire 95a shown by a two-dot-and-dash line in FIG. 2 is at one end connected to the wire 95b via a spring on the right side in the figure and from the one end, trained around the idler 97a, movable pulley 96a, idler 97 (on the right), wire driving pulley 94, idler 97 (on the left), an attachment 98a on the reader light source unit 31, and movable pulley 96a, and at another end secured to a wire fixture 99a. Similarly, the wire 95b shown by a one-dot-and-dash line in FIG. 2 extending from the spring connection to the wire 95a is trained around the idler 97b (on the right), movable pulley 96b, idler 97b, idler 97 (on the right), wire driving pulley 94, idler 97 (on the left), idler 97b (on the left), an attachment 98b on the reader light source unit 31, and movable pulley 96b, and secured to a wire fixture 99b.

Each of the wires 95a and 95b is trained around the wire driving pulley 94 at least one turn so that rotation of the wire driving pulley 94 winds up or unwinds the wires 95a and 95b for moving the reader light source unit 31 at a predetermined speed, for example, at a scanning speed and concurrently the mirror unit 35 at a speed of one-half of the scanning speed.

The translation speed or scanning speed of the reader light source unit 31 during pre-scanning and principal scanning can be altered either by changing the rotational speed of the reader drive motor 92 itself or by changing the reduction ratio of the speed governor 93.

The CCD 38 is a line sensor for photoelectrically converting a line of original image light values in a main scan direction into main scan one-line analog image data signals Sa. The line sensor is not limited to CCD and any desired line sensor may be used. It will be understood that the analog image data Sa along main scan direction one line read by the CCD 38 are defined as analog image data extending over an entire longitudinal area of the slit 28 in the main scan direction, i.e., analog image data within a platen effective range in the main scan direction. If the length of transparent original G in the main scan direction is shorter than the length of the slit 28, the image data contain additional data other than the original image data, e.g., data associated with the underside of the original cover (not shown).

The image processor 14 includes a clock generator 40 for generating main scan clocks $\phi x$ for determining the timing of reading the main scan one-line image data from the CCD 38; an A/D converter 42 for receiving the analog image data signals Sa from the CCD 38 on the basis of the main scan clocks $\phi x$, effecting an analog correction such as a gain correction, and thereafter converting the signals into digital signals in the form of image data signals S; and an image processing unit 44 for executing the image reading method of the present invention during pre-scanning through the use of the image data signals S and for image-processing the image data signals S for finally delivering the signals S to an image recording device as halftone (dot) image signals during principal scanning. In this image processing unit 44, corrections associated with the CCD such as shading correction and dark correction are made on the image data signals S on the basis of main scan and auxiliary scan clock signals $\phi x$ and $\phi y$ from the clock generator 40 and any desired image processing is then carried out. That is, during pre scanning, such image processing as original edge detection or automatic density measurement is carried out after suitable subsampling. On the other hand, during principal scanning, such image processing as logarithmic transformation, gradation conversion, scale factor conversion, smoothing, sharpening and dot formation is carried out for delivering the signals as binarized dot (halftone) image signals R to an image recording device (not shown).

Figure 3:
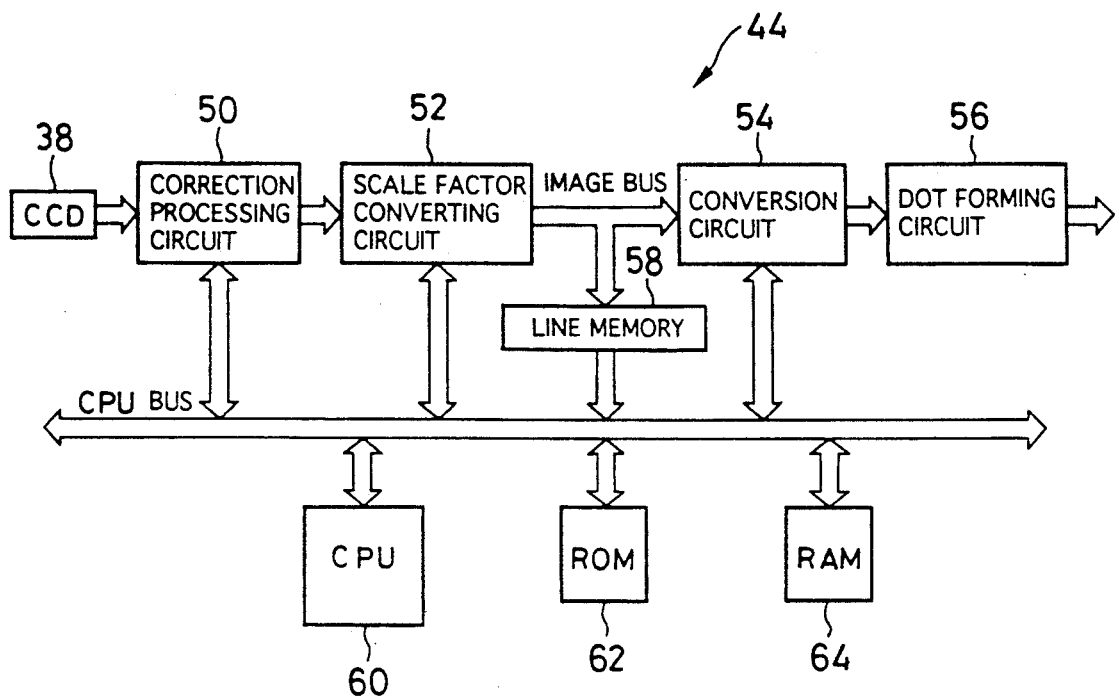
FIG. 3 is a block diagram showing an image processing section of the image reading apparatus of FIG. 1.

FIG. 3 illustrates the detailed construction of the image processing unit 44 in FIG. 1. The image processing unit 44 includes a correction processing circuit 50, a scale factor converting circuit 52, a conversion processing circuit 54 and a halftoning circuit 56, through which the image data flow via an image bus; a line memory 58 led from the image bus between the scale factor converting circuit 52 and the conversion processing circuit 54 and connected to a CPU bus; and a CPU 60, a ROM 62 and a RAM 64 for transferring and receiving information to and from each other through the CPU bus. A variety of image processing operations are effected by connecting the correction circuit 50, scale factor converting circuit 52, conversion processing circuit 54, and halftoning circuit 56 to the CPU 60, ROM 62 and RAM 64 through the CPU bus.

The correction circuit 50 includes a pre-processing circuit and a CCD correction circuit. The pre-processing circuit functions to compensate for noise components by use of mask image signals in the dark, the noise components being concomitant with fluctuations in offset error such as voltage fluctuations and temperature drifts of analog elements such as a line sensor, an amplifier and an A/D converter. For example, if an image signal level in the dark fluctuates over a plurality of scanning lines, the offset error is compensated for on every line, thereby stabilizing the signal. The CCD correction circuit functions to effect a shading correction for correcting fluctuations in light receiving quantity (including fluctuations in the illumination light) which are derived from unevenness between pixels of the CCD 38 which is a solid-state imaging element and also a dark correction for correcting base fluctuations of the respective pixels (existing even in the absence of incident light). The light receiving signals of the respective pixels are uniformed on a common base. For instance, for an identical original image density, there are provided the same image data (image signals).

The scale factor converting circuit 52 functions to convert the main scan direction one-line image data read by the CCD 38 into image signals corresponding to main scan direction pixel densities in accordance with an image forming scale factor such as a predetermined scale factor of enlargement or contraction. This circuit 52 can provide a quantity of image data required as one-line image data by subsampling image data from the main scan direction one-line image data at a predetermined subsample rate. For example, the scale factor converting circuit 52 subsamples approximately 250 pixels from the total 7,500 pixels constituting the one-line input image data during pre-scanning, providing a data quantity corresponding to about 1/30 of the initial data quantity. The line memory 58 is required for storing the one-line image data read over the platen main scan direction effective range during pre-scanning for enabling detection of the main scan range of the original or its effective image region and automatic density measurement. The line memory 58 is a memory for storing the one-line image data subsampled by the scale factor converting circuit 52. The one-line image data once stored in the line memory 58 are read out by the CPU 60 and employed for a variety of computation processes for image processing.

The conversion circuit 54 includes a logarithmic transform circuit for effecting logarithmic transformation of image signals and a gradation conversion circuit for converting the image signals into image signals corresponding to gradation characteristics (exposure quantity to density characteristics). The conversion circuit 54 is adapted to convert signals for image recording.

Figure 4:
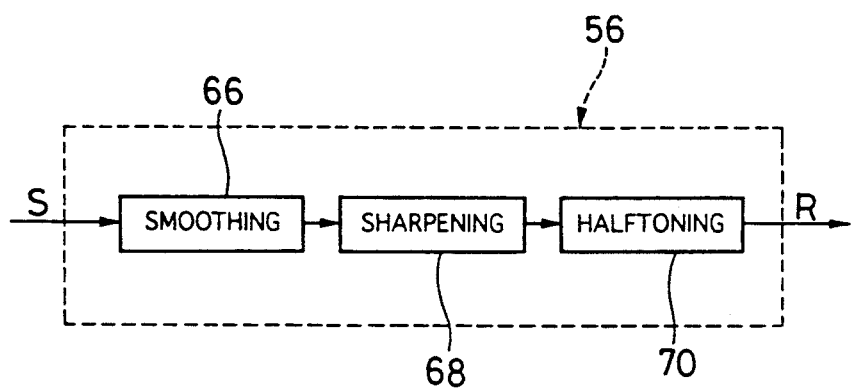
FIG. 4 is a flow chart showing one exemplary halftoning circuit in the image processing section of FIG. 3.

The halftoning circuit 56 includes a smoothing process circuit 66, a sharpening process circuit 68 and a dot decomposing process circuit 70 as shown in FIG. 4. The smoothing circuit 66 is effective for averaging input image data and peripheral pixel data for unsharpening said input image data to reduce noise contained in the image data signals, thereby producing corrected image data. The sharpening circuit 68 performs a sharpening process by enhancing the outline and edges of the image. For instance, the circuit is effective for subtracting a constant multiple of the smoothed image data from the original image data for unsharp masking to increase image sharpness, thereby achieving edge enhancement. The halftoning circuit 70 generates a dot (halftone) image signal from the image density signal. This dot image signal is obtained through area modulation of the image density in accordance with a necessary angle and screen ruling number. This dot image signal is delivered to the image recording device. The halftoning circuit 56 is included in the illustrated embodiment since the image reading apparatus is intended for use in printing plate making apparatus for producing halftone images. When the invention is applied to conventional printers and copying apparatus, the halftoning circuit may be omitted and instead, a processing circuit adapted for any desired output image is used.

Based on a control sequence stored in the ROM 62, the CPU 60 controls the above-mentioned circuits including the correction circuit 50, scale factor converting circuit 52, and conversion circuit 54 as well as the smoothing circuit 66, sharpening circuit 68 and halftoning circuit 70 of the dot forming circuit 56. The CPU 60 also performs a variety of control processes required for image processing and processing of multiple data stored beforehand in the RAM 64 and the data input by the user, e.g., the effective image region data in the main scan direction, as well as measurement of necessary image processing data such as detection of the principal scanning range and automatic density measurement by reading out the main scan direction one-line image data from the line memory 58 during pre-scanning.

Additionally, the CPU 60 performs various other controls including control of movement of the reader light source unit 31 or scanner and the mirror unit 35 of the image reader 12 during pre-scanning on the outward path, control of movement of the reader light source unit 31 or scanner and the mirror unit 35 on the homeward path, and setting and control of the reading speed of the original image which is determined in accordance with a rate and factor of exposure to a photosensitive material in an image exposure section of the image recording device, that is, a pattern of the speed of the reading scanner or reader light source unit 31 (including the principal scanning speed) on the homeward path which is synchronized with the exposure rate. Also the CPU 60 may control the overall operation of the printing plate making apparatus 10. The RAM 64 is a main memory for storing data necessary for the CPU 60 to perform various controls.

Referring to FIG. 1 again, the original transmission assembly 16 rests on the image reader 12 of the above-mentioned construction in place so as to cover the platen 22 and is connected to the image reader 12 through suitable means (not shown).

The original transmission assembly 16 includes a housing 100, a transmitter light source unit 102 disposed within the housing 100 for illuminating the transparent original G for reading, and drive means 104 for driving the transmitter light source unit 102.

More particularly, the transmitter light source unit 102 includes an elongated light source 106 extending in the same direction as the reader light source unit 31 or reading scanner, for example, in the form of a rod-shaped tungsten-halogen lamp or fluorescent lamp for emitting reading light, and a casing 110 defining a slit 108 for limiting the width of the reading light from the elongated light source 106 in the auxiliary scan direction for providing slit light of a predetermined width. It is to be noted that the elongated light source 106 is not limited to a single one as illustrated in the figure.

The drive means 104 for driving the transmitter light source 102 includes a timing belt 112 to which the transmitter light source unit 102 is secured, pulleys 114 and 116 around which the timing belt 112 is trained, and a drive source 118 in the form of a pulse motor or stepper motor engaged with the pulley 116 through a reduction gear (not shown).

The original transmission assembly 16 operates such that transparent original G is scanned over a two-dimensional extent with the reading light from the transmitter light source unit 102 (exactly, elongated light source 106) by actuating the drive means 104 for translating the transmitter light source unit 102, with the elongated light source 106 lighted, in a direction of arrow a or b.

For reading transparent original G, the image reading apparatus 10 includes a transmission read control 80 for controlling the position and operation of the transmitter drive source 118 of the original transmission assembly 16 and the drive motor 92 of the reader light source unit 31 of the image reader 12 in order that the transmitter light source unit 102 of the original transmission assembly 16 and the reader light source unit 31 of the image reader 12 are synchronized in scanning speed and matched in scanning start position for enabling reading of transparent original G with a predetermined light quantity of light while maintaining both the light source units in a relative position with their optical axes aligned. The operation of this control 80 will be described later.

The transparent original G is read by the image reading apparatus 10 by resting transparent original G on the platen 22 at a predetermined position, and then placing the original transmission assembly 16 on the image reader 12 at a predetermined position.

Upon receipt of a signal indicative of exposure start, the system actuates the elongated light source 106 of the original transmission assembly 16. During reading of transparent original G, the fluorescent lamps 26, 26 in the reader light source unit 31 are not lighted.

With the elongated light source 106 lighted, the transmitter drive source 118 starts rotating and the transmitter light source unit 102 starts moving in the arrow a direction for illuminating transparent original G from above. In synchronization with this, the reader drive motor 92 shown in FIG. 2 starts rotating and the reader light source unit 31 and the mirror unit 35 start moving in the arrow a direction at a pre-scanning speed and a one-half speed thereof, respectively. Then the transmitter and reader light source units 102 and 31 synchronously move in the auxiliary scan direction with their position matched. Pre-scanning of the original image is started in this way.

The transmitter light source unit 102 emits light which is transmitted by transparent original G and then by the slit 28 of the reader light source unit 31. The transmitted slit light travels along the light path L, that is, is reflected in the predetermined direction by the first mirror 30, and then in the predetermined (opposite) direction by the second and third mirrors 32 and 34 of the mirror unit 35 which is moving in the same direction as the reader light source unit 31 at a one-half speed. The slit light traveling along the light path L and extending in the main scan direction is focused at the CCD 38 through the focusing lens 36. The CCD sensor 38 photoelectrically converts the slit light in the main scan direction into a line of analog image data signals Sa and delivers the signals to the image processor 14.

In the image processor 14, the analog image data signals Sa are converted by the A/D converter 42 into digital image signals S which are delivered to the image processing unit 44. In the image processing unit 44, the image data signals S are subjected to a variety of corrections in the correction circuit 50 and subsampled at a predetermined subsample rate in the scale factor converting circuit 52. Thereafter, a predetermined amount of main scan direction one-line image data are stored in the line memory 58. The CPU 60 then performs data calculations and processing required for principal scanning, for example, various image processing operations such as image density prediction and original edge detection.

After pre-scanning is completed in this way, principal scanning is started for reading the image in transparent original G. In the principal scanning, main scan direction one-line image data are read out by the image reader as in the pre-scanning step described above, processed by the image processor 14, once stored in the line memory 58, read out again therefrom, subjected to gradation conversion in the conversion processing circuit 54 and halftone processing in the dot forming circuit 56, and thereafter delivered to the image recording device or the like as binarized halftone image signals R.

It will be understood that instead of transparent original G, a reflective original such as a photograph and printed document may be read by the apparatus. To this end, the original transmission assembly 16 is removed, and a reflective original is rested on the platen 22 at a predetermined position and held in place by a platen cover (not shown) as in conventional image reading apparatus. With the fluorescent lamps 26, 26 of the reader light source unit 31 lighted, the original is illuminated from below and the reflected light is read. The image in the reflective original is read out in this way.

The image reading apparatus 10 has a basic construction as mentioned above. In order to read transparent original G with an optimum quantity of light, it is necessary to translate the transmitter and reader light source units 102 and 31 with their optical axes aligned during scan reading of the transparent original. The transmitter and reader light source units 102 and 31 must be maintained in alignment throughout scan reading of transparent original G. More particularly, in the illustrated embodiment, the slit 108 of the transmitter light source unit 102 and the slit 28 in the casing 29 of the reader light source unit 31 are aligned in the auxiliary scan direction so as to allow the slit light emitted by the transmitter light source unit 102 and transmitted by transparent original G to pass the slit 28 without obstruction by the casing 29. The slits must be maintained in continuous alignment while transparent original G is read by scanning.

Nevertheless, conventional image reading apparatus often fail to provide a reading of the transparent original with an optimum quantity of light because the relative position between the transmitter and reader light source units 102 and 31 is altered for reasons including an individual difference in the reader drive motor 92 serving as a drive source for the reader light source unit 31 and the transmitter drive 118 serving as a drive source for the transmitter light source unit 102 as well as a dislocation of the home position by shocks as occurring upon attachment of the original transmission assembly 16.

In contrast, the image reading apparatus 10 ensures a high quality reading of the transparent original with an optimum quantity of light by achieving synchronization in scanning speed and matching in scanning start position between the transmitter and reader light source units 102 and 31 by the following method by virtue of the transmission read control 80, thereby maintaining the relative position of the light source units in continuous optical axis alignment.

Figure 5:
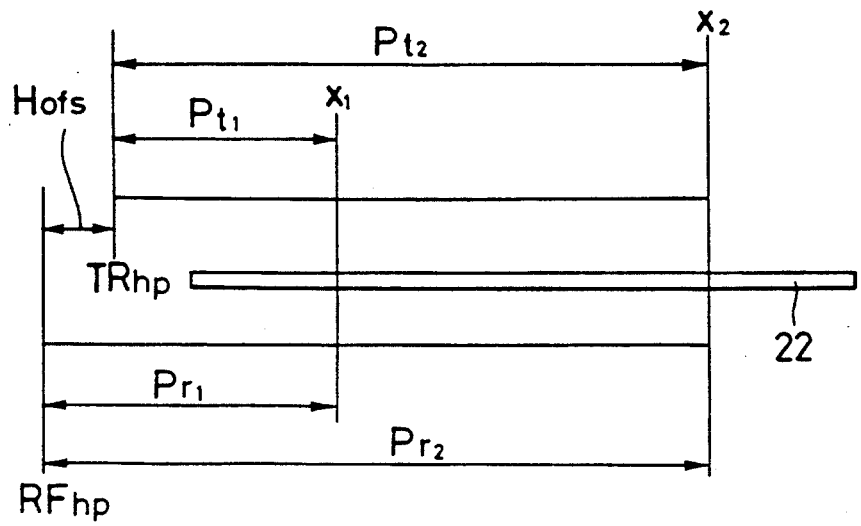
FIG. 5 schematically illustrates the procedure of a first embodiment of the image reading method of the invention.

Referring to FIG. 5, it is described how to achieve synchronization in scanning speed between the transmitter and reader light source units 102 and 31 in accordance with the first aspect of the present invention.

Figure 6:
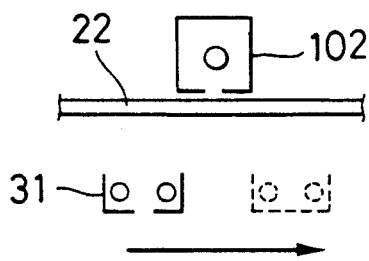
FIG. 6 schematically illustrates one exemplary operation for preparing a light quantity distribution chart in the image reading method of the invention.
Figure 7:
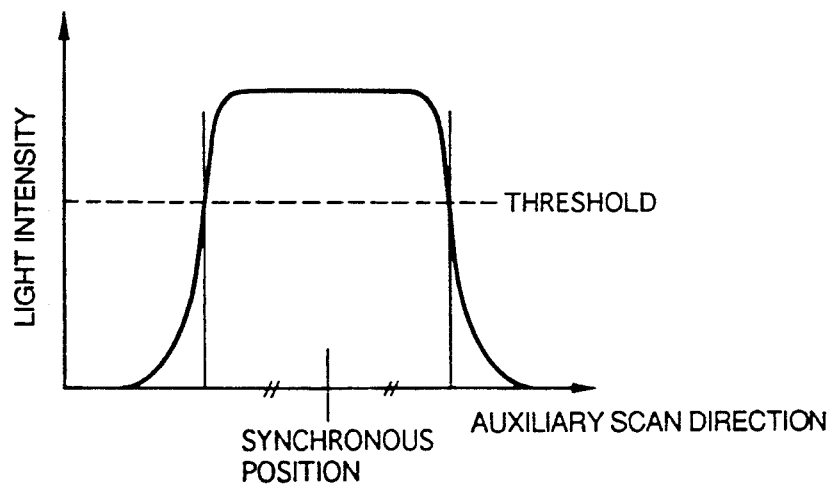
FIG. 7 is a graph showing an exemplary light quantity distribution chart.

In the image reading apparatus 10 shown in FIGS. 1 to 4, transparent original G is rested on the image reader 12 at a predetermined position. Upon receipt of a command for speed synchronization, the transmission read control 80 actuates the transmitter drive source 118 to translate the transmitter light source unit 102 to an arbitrary selected position $x_1$ in the auxiliary scan direction. Thereafter, the control 80 depicts a curve representing a light intensity (quantity) distribution in the auxiliary scan direction in proximity to position $x_1$ as shown in FIG. 7 by scanning the proximity of position $x_1$ with the reader light source unit 31 (only the casing and lamps are schematically shown in FIG. 6) and measuring the quantity (intensity) of reading light available from the transmitter light source unit 102 through transparent original G by means of the optical reading system of the image reader 12. More particularly, the transmitted light read by this scanning is photoelectrically converted by the CCD 38 and processed by the image processor 14.

After the main scan direction one-line light quantity data (density data) are stored in the line memory 58, the CPU 60 shown in FIG. 3 reads out one-line light quantity data from the line memory 58, averages image data in the preset platen main scan direction effective range, and calculates an average light quantity of said line. Then the CPU 60 causes the line memory such as RAM 64 to store the corresponding auxiliary scan position and average light quantity of said line and plots the average light quantity in an auxiliary scan direction light quantity distribution chart. After this plotting, the next one-line image data are taken into the line memory 58 in the same manner. The CPU 60 similarly adds a light quantity plot to the light quantity distribution chart. This routine is repeated from a scan start position to a scan end position of the reader light source unit 31 across position $x_1$ under the platen 22. The CPU 60 thus completes the light quantity distribution chart shown in FIG. 7.

This light quantity distribution chart is transferred from the CPU 60 to the control 80. Based on the light quantity distribution chart, the control 80 determines the position of reader light source unit 31 to be synchronized with position $x_1$ of the transmitter light source unit 102.

The synchronous position may be determined, for example, by previously setting a threshold as shown in FIG. 7, delimiting a region exceeding the threshold, and considering the center of the region in the auxiliary scan direction to be the synchronous position, or by considering a peak of the light quantity distribution chart to be the synchronous position.

Next, such synchronous position detection is carried out at another arbitrary position $x_2$.

If both the drive motor 92 of reader light source unit 31 and the drive source 118 of transmitter light source unit 102 are pulse motors each having an encoder built therein, then the distance of translation of the transmitter light source unit 102 from its home position (TRhp) to position $x_1$ is given by pulse $Pt_1$ and similarly, the distance of translation to position $x_2$ is given by pulse $Pt_2$. Similarly, the distance of translation of the reader light source unit 31 from its home position (RFhp) to (synchronous) position $x_1$ is given by pulse $Pr_1$ and the distance of translation to position $x_2$ is given by pulse $Pr_2$.

In general, a drive system using a pulse motor has an inherent pulse-to-distance conversion coefficient (a distance of translation per pulse), and a change in the scanning speed of the transmitter light source unit 102 or reader light source unit 31 mainly occurs due to a change in the pulse-to-distance conversion coefficient. Provided that the transmitter drive source 118 has a pulse-to-distance conversion coefficient Kt and the reader drive motor 92 has a pulse-to-distance conversion coefficient Kr, the distance of translation of the transmitter light source unit 102 is given by Kt·Pt and the distance of translation of the reader light source unit 31 is given by Kr·Pr.

The difference between the distances of translation of the transmitter and reader light source units 102 and 31 at each of positions $x_1$ and $x_2$ is equal to the spacing Hofs between the home positions of the transmitter and reader light source units 102 and 31 and given by the following equations.

$$Kr \cdot Pr_1 - Kt \cdot Pt_1 = Hofs \quad (mm)$$

$$Kr \cdot Pr_2 - Kt \cdot Pt_2 = Hofs \quad (mm)$$

Since Hofs must be equal in these equations, if the precise speed, translation distance, and pulse-to-distance conversion coefficient of either one of the transmitter and reader light source units 102 and 31 are determined by means of a speed sensor, position sensor or the like, the pulse-to-distance conversion coefficient of the other unit can be calculated therefrom. For example, if the pulse-to-distance conversion coefficient Kr of the reader light source unit 31 is precisely known, the pulse-to-distance conversion coefficient Kt of the transmitter light source unit 102 is calculated by the following equation.

$$Kt = [(Pr_2 - Pr_1)/(Pt_2 - Pt_1)] \cdot Kr$$

In a system using pulse motors, the translation speeds of the transmitter and reader light source units 102 and 31 are determined by the frequencies and pulse-to-distance conversion coefficients of the pulse motors (transmitter drive source 118 and reader drive motor 92). Accordingly, based on a given pulse-to-distance conversion coefficient, transmission read control 80 functions to adjust the frequency of driving the transmitter drive source 118 or reader drive motor 92 such that the scanning speeds of the transmitter and reader light source units 102 and 31 may become equal. Then the transmitter and reader light source units 102 and 31 are synchronized in speed during the scan reading of transparent original G.

Once adjustment is done to synchronize the speeds of the transmitter and reader light source units 102 and 31, little or no error is introduced for a substantial period. Therefore, this adjustment may be done at the time of mounting the image reader, after repair of a failure, substantial movement of the installation site or the like, and need not be done on every reading of transparent original G. In this regard, adjustment should preferably be done with high precision. To this end, the scanning speed of the reader light source unit 31 (or transmitter light source unit 102) during preparation of the light quantity distribution chart should preferably be as low as possible.

Even when accurate synchronization in speed is established between the transmitter light source unit 102 which is a transparent original reading light source and the reader light source unit 31 which is a reading scanner, if their relative position is out of optical axis alignment at the point of time when reading of transparent original G is started, then it is impossible to achieve high precision reading of transparent original G with an optimum quantity of light.

In the second aspect of the present invention, the transmitter and reader light source units 102 and 31 are located at a correct relative position or in alignment when scan reading of transparent original G is started.

Figure 8:
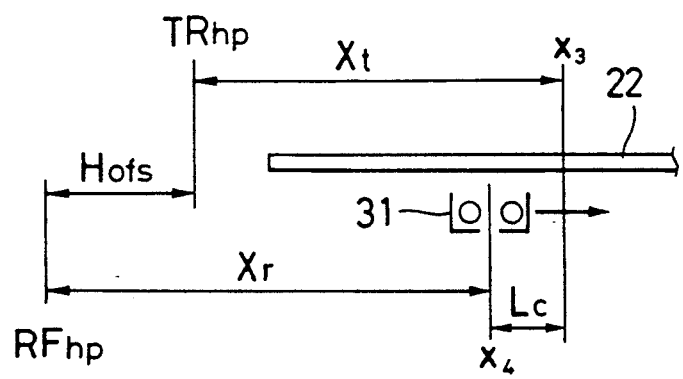
FIG. 8 schematically illustrates the procedure of a second embodiment of the image reading method of the invention.

The alignment procedure is described in conjunction with FIG. 8. The original transmission assembly 16 is disposed in place on the image reader 12. Upon receipt of an alignment signal, the transmission read control 80 operates to actuate the transmitter drive source 118 to translate the transmitter light source unit 102 to an arbitrary selected position $x_3$ in the auxiliary scan direction.

Next, the control 80 operates to translate the reader light source unit 31 (only the casing and lamps are depicted) to a position $x_4$ close to position $x_3$ and stop the unit at that position. As in the previous embodiment, the proximity of $x_3$ is scanned to prepare a chart representing the distribution of a light quantity in the proximity of position $x_3$ in the auxiliary scan direction, thereby determining the synchronous position of the transmitter and reader light source units 102 and 31.

Provided that Xt is the distance covered by the transmitter light source unit 102 from its home position (TRhp) to position $x_3$, Xr is the distance covered by the reader light source unit 31 from its home position (RFhp) to position $x_4$, and Lc is the distance covered by the reader light source unit 31 from position $x_4$ to the synchronous position, the spacing Hofs between the home positions is given by the following equation.

$$Hofs = (Xr + Lc) - Xt$$

Then, by carrying out alignment at the start of transparent original reading by taking into account this Hofs, both the light source units can be positioned in accurate alignment of their optical axes when they are in positions ready for the start of reading. Then on reading the transparent original, the control 80 carries out pre-scanning and scan reading after the transmitter and reader light source units 102 and 31 are aligned by actuating the transmitter drive source 118 and the reader drive motor 92 in accordance with Hofs.

The distances Xr, Xt, etc. can be readily calculated if the pulse-to-distance conversion coefficient associated with the speed synchronization is known, and alternatively, measured using a position or speed sensor.

Although the reader light source unit 31 is once stopped at position $x_4$ before it performs scanning in the proximity of $x_3$ in the above-described embodiment, the present invention is not limited thereto. For example, scanning in the proximity of $x_3$ may be performed by continuously translating the reader light source unit 31 from its home position.

The spacing Hofs between the home positions of the transmitter and reader light source units 102 and 31 readily varies as a result of attachment and removal of the original transmission assembly 16 or opening and closing of a cover thereof. Therefore, alignment should preferably be carried out every time when scan reading of transparent original G is to be made or the original transmission assembly 16 is attached.

In the above-described embodiment for providing speed synchronization and scan start position matching (alignment) between the transmitter and reader light source units 102 and 31, the light quantity distribution was measured by moving the reader light source unit 31 for scanning with the transmitter light source unit 102 stopped at an arbitrary position. The present invention is also embodied in a reverse relationship, that is, a light quantity distribution chart can be prepared by moving the transmitter light source unit 102 for scanning with the reader light source unit 31 fixed.

The image reading method and apparatus of the present invention allow the transmitting light source for reading of a transparent original and the reading scanner of the image reader to have an accurately identical scanning speed or be accurately aligned at the scan reading start position, thereby enabling reading of the transparent original while matching the transmitting light source and the reading scanner in alignment between their optical axes and maintaining them at a desired relative position during scan reading. This enables high-quality reading of a transparent original with an optimum light quantity.

I claim:

1. A method for reading an image from a transparent original on a platen using a transmitting light source extending in a one-dimensional direction for emitting light toward the original and a reading scanner disposed below said platen and extending in said one-dimensional direction for receiving the light transmitted by the original, the method comprising the steps of:

translating the transmitting light source in an auxiliary scanning direction substantially perpendicular to said one-dimensional direction for illuminating the original over a two dimensional extent; and translating the reading scanner in synchronization with said transmitting light source;

thereby photoelectrically reading the image in the original;

wherein the step of providing synchronization in scanning speed between said transmitting light source and said reading scanner comprising the steps of:

positioning either one of said transmitting light source and said reading scanner at a selected position;

scanning the other one of said transmitting light source and said reading scanner in the proximity of said selected position;

obtaining the distribution of a quantity of light transmitted by the original during the scanning;

determining a synchronous position for the other one corresponding to the selected position on the basis of said light quantity distribution;

performing said synchronous position detection at two or more distinct positions;

obtaining the number of pulses developed by the transferring to said synchronous position said transmitting light source and said reading scanner; and calculating from the number of pulses the pulse-to-distance conversion coefficient of at least one of said transmitting light source and said reading scanner.

2. An image reading apparatus comprising:

an image reader including a platen on which an original rests, a reading scanner for irradiating reading light extending in a one-dimensional direction to the original on the platform, a drive means for translating the reading scanner at a predetermined scanning speed in a direction substantially perpendicular to said one-dimensional direction, and an photo-electric transducer means for receiving the reading light reflected by the original;

an original transmission assembly removably disposed on the platen at a predetermined position, said assembly including a transmitting light source for emitting reading light extending in the one-dimensional direction toward a transparent original on the platen, and drive means for translating the transmitting light source in synchronization with the translation of said reading scanner; and synchronization means for providing synchronization in scanning speed between said transmitting light source and said reading scanner by disposing the original transmission assembly on the platen of said image reader, translating either one of said transmitting light source and said reading scanner to a selected position, scanning the other one of said transmitting light source and said reading scanner in the proximity of said selected position, obtaining the distribution of a quantity of light transmitted by the original during the scanning, determining a synchronous position for the other one corresponding to the selected position on the basis of said light quantity distribution, performing said synchronous position detection at two or more distinct positions, obtaining the number of pulses developed by the transferring to said synchronous position said transmitting light source and said reading scanner, and calculating from the number of pulses the pulse-to-distance conversion coefficient of at least one of said transmitting light source and said reading scanner.

3. A method for reading an image from a transparent original on a platen using a transmitting light source extending in a one-dimensional direction for emitting light toward the original and a reading scanner disposed below said platen and extending in said one-dimensional direction for receiving the light transmitted by the original, the method comprising the steps of:

translating the transmitting light source in an auxiliary scanning direction substantially perpendicular to said one-dimensional direction for illuminating the original over a two dimensional extent; and translating the reading scanner in synchronization with said transmitting light source;

thereby photoelectrically reading the image in the original, each of said transmitting light source and said reading scanner having a base point and a scan start position at which it is positioned at the start of scan reading of the original;

wherein the step of providing matching between the scan start positions of said transmitting light source and said reading scanner prior to reading of the original comprising the steps of:

positioning either one of said transmitting light source and said reading scanner at a selected position;

scanning the other one of said transmitting light source and said reading scanner in the proximity of said selected position;

obtaining the distribution of a quantity of light transmitted by the original during the scanning;

determining a synchronous position for the other one corresponding to the selected position on the basis of said light quantity distribution; and determining the relative spacing between the base points of said transmitting light source and said reading scanner from the distances from the respective base points of said transmitting light source and said reading scanner to the synchronous position, the scan start positions being matched in accordance with the relative spacing.

4. An image reading apparatus comprising:

an image reader including a platen on which an original rests, a reading scanner for irradiating reading light extending in a one-dimensional direction to the original on the platform, a drive means for translating the reading scanner at a predetermined scanning speed in a direction substantially perpendicular to said one-dimensional direction, and an photo-electric transducer means for receiving the reading light reflected by the original;

an original transmission assembly removably disposed on the platen at a predetermined position, said assembly including a transmitting light source for emitting reading light extending in the one-dimensional direction toward a transparent original on the platen, and drive means for translating the transmitting light source in synchronization with the translation of said reading scanner, each of said transmitting light source and said reading scanner having a base point and a scan start position at which it is positioned at the start of scan reading of the original, and alignment means for providing matching between the scan start positions of said transmitting light source and said reading scanner prior to reading of the original by translating either one of said transmitting light source and said reading scanner at a selected position, scanning the other one of said transmitting light source and said reading scanner in the proximity of said selected position, obtaining the distribution of a quantity of light transmitted by the original during the scanning, determining a synchronous position for the other one corresponding to the selected position on the basis of said light quantity distribution; and determining the relative spacing between the base points of said transmitting light source and said reading scanner from the distances from the respective base points of said transmitting light source and said reading scanner to the synchronous position, the scan start positions being matched in accordance with the relative spacing.

* * * * *